Oct. 22, 1963 J. L. STERLING 3,107,414

METHOD OF FORMING CIRCUIT CARDS

Filed Dec. 24, 1959 3 Sheets-Sheet 1

Oct. 22, 1963 J. L. STERLING 3,107,414

METHOD OF FORMING CIRCUIT CARDS

Filed Dec. 24, 1959 3 Sheets-Sheet 2

Oct. 22, 1963 J. L. STERLING 3,107,414

METHOD OF FORMING CIRCUIT CARDS

Filed Dec. 24, 1959 3 Sheets-Sheet 3

United States Patent Office 3,107,414
Patented Oct. 22, 1963

3,107,414
METHOD OF FORMING CIRCUIT CARDS

John L. Sterling, Poughkeepsie, N.Y., assignor to International Business Machines Corporation, New York, N.Y., a corporation of New York Filed Dec. 24, 1959, Ser. No. 861,989
4 Claims. (Cl. 29—155.5)

This invention relates to the fabrication of electrical apparatus and more particularly to an improved method for producing circuit cards in which all but the connection points are encapsulated.

The usual printed circuit card is subject to failure due to loosening or peeling of the circuit members by vibration, and short circuiting by foreign objects or atmospheric moisture.

Furthermore, the manufacture of the usual printed circuit requires special printing and etching processes that are expensive and time consuming.

It is therefore the principal object of this invention to provide a circuit card composed of a plurality of layers of plastic into which conductive cutouts constituting one or more circuits are transferred by use of a steel rule punch and die prior to being plasticized into an encapsulated circuit with only the connection points or lands exposed.

A further object of this invention is to provide a circuit card wherein the circuit is encapsulated making it free from damage by vibration moisture and foreign objects.

Another object is to provide a circuit card that is manufactured by a simple and inexpensive method.

The foregoing and other objects, features and advantages of the invention will be apparent from the following more particular description of preferred embodiments of the invention, as illustrated in the accompanying drawings.

In the usual form of circuit card a thin foil of copper is secured by adhesive to an insulating board of plastic or other well known material. Using a photo-resist and a silk screen the circuit is printed on the copper. The copper is then etched leaving the circuit outlined on the plastic. This circuit is exposed to the moisture in the atmosphere and foreign objects either of which may short out a portion of the circuit. Being held in place by an adhesive the circuit may peel or come loose due to vibration.

The circuit board of the invention is formed by transferring a circuit out of a sheet of tinned copper into a sheet of uncured plastic by the use of inexpensive steel rule dies. The plastic sheet may be thermo setting such as aniline formaldehyde or phenolic and the like or a thermo plastic such as styrene or a polyamide. A number of circuits may be assembled layer on layer and then plasticized completely encapsulating the circuits.

Figure 1:
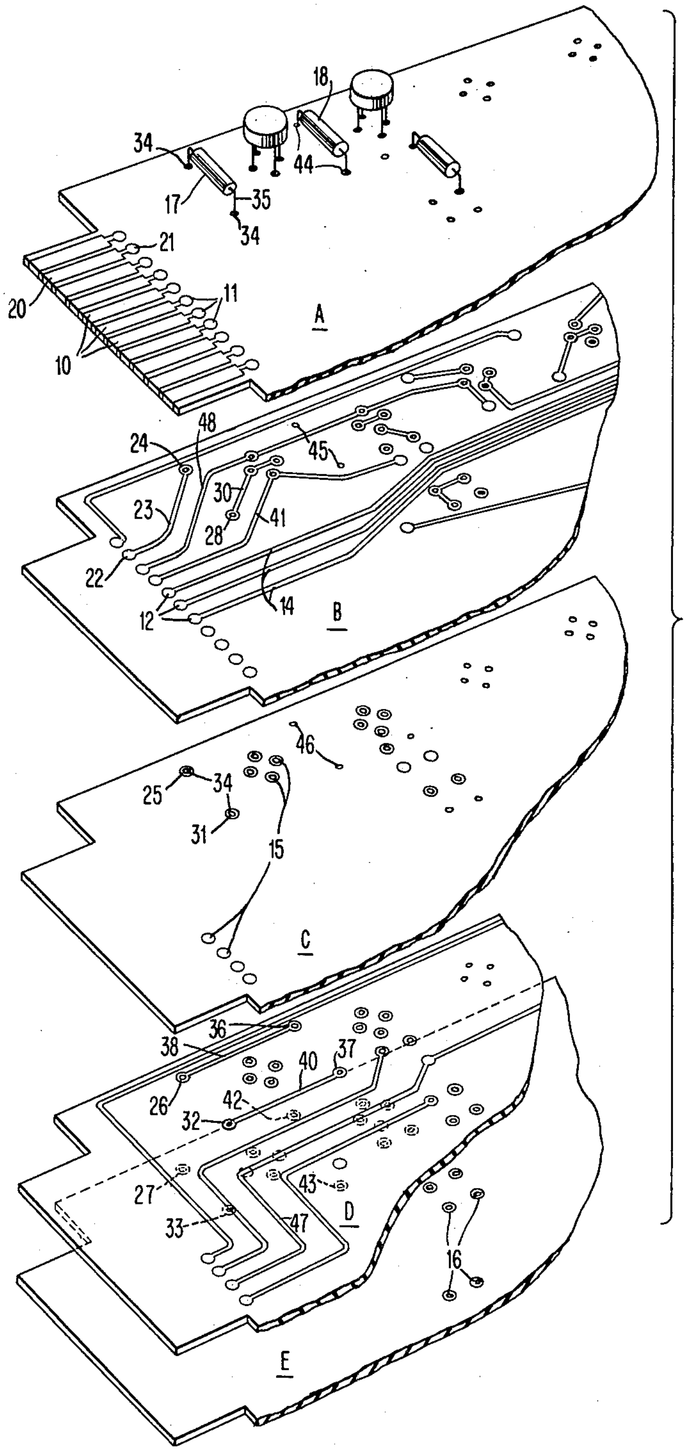
FIG. 1 is an exploded view of a circuit card according to the invention.
Figure 2:
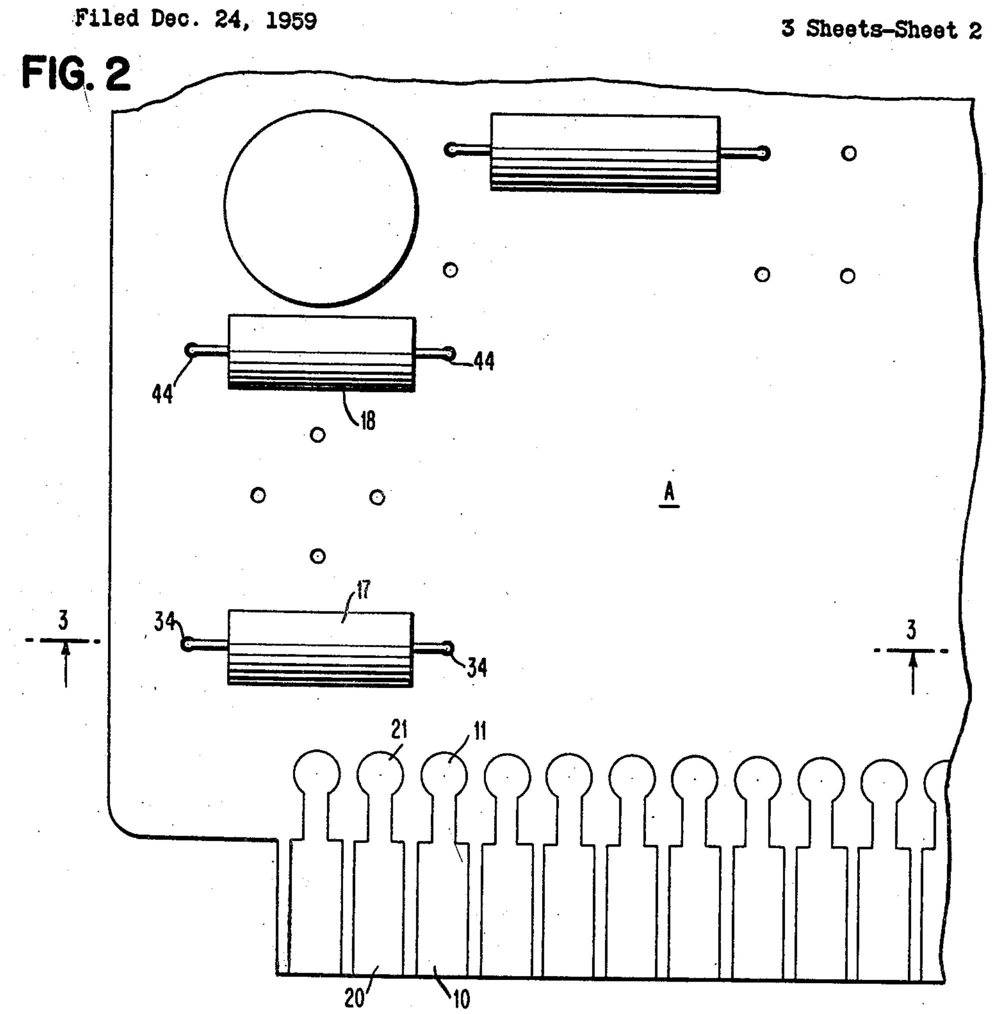
FIG. 2 is a plan view of a card with some components in place.

In FIG. 1 several layers of such a circuit board are shown before plasticizing. Plastic layer A is provided with edge contacts 10 by which the circuits in the card are connected in a well known manner to other circuits in a machine such as a computer. The contacts 10 end in enlarged circular lands 11. In layer B are corresponding lands 12 from which the conductors such as 14 go to different parts of the board. A conductor in layer D may be connected to one in layer B by lands such as 15 in the layer C. Also all component circuits are carried through layer E by lands such as 16 to provide connection points to which component leads may be soldered.

Figure 3:
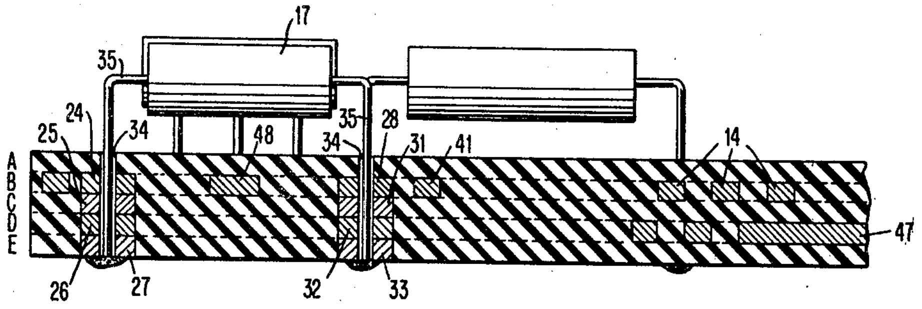
FIG. 3 is a cross section taken along line 3—3 of FIG. 2.

An example of a circuit in which a resistance 17 is bridged by a condenser 18 will be traced in FIGS. 1 and 3. The circuit enters the board through edge contact 20 and is carried by lands 21 and 22 over conductor 23 to a land 24. Lands 25, 26 and 27 carry the circuit through plastic layers C, D and E respectively. The other side of the circuit extends from a land 28 over conductor 30 to a transistor. Land 28 is connected by land 31 in layer C to a land 32 in layer D and then to a land 33 in layer E. Holes 34 are formed by drilling through the layer A and lands 24, 25, 26 and 27 on one hand and layer A and lands 28, 31, 32 and 33 permit the leads 35 to be inserted and crimped over for soldering to lands 27 and 33 respectively.

Extending from lands 26 and 32 to lands 36 and 37 (layer D) are conductors 38 and 40 for bridging the condenser 18 across resistor 17. It will be noted that the conductor 40 extends under a conductor 41 in layer B and is insulated therefrom by the plastic of layer C. Lands 36 and 37 are conducted through layer E by lands 42 and 43 respectively. Holes 44, 45 and 46 are formed in layers A, B and C and holes are formed in lands 36, 37, 42 and 43 to accommodate the leads of condenser 18. The lands 42 and 43 provide soldering points for these leads. Only the lands necessary for an explanation of the invention have been indicated in layer E.

In FIG. 3 is shown a cross section of five layers of circuit that have been plasticized into a unit card or wafer. In this showing it will be noted that conductor 47 (FIG. 1, layer D) passes under conductors 14 in layer B and is insulated therefrom by layer C.

From the above description it is apparent that the invention provides a completely encapsulated circuit or circuits that are insulated from one another except at points of connection where they are carried through an insulating layer by a land. Also no circuit except that needed for connecting components is exposed to moisture or the possibility of short circuit by foreign bodies.

Figure 4:
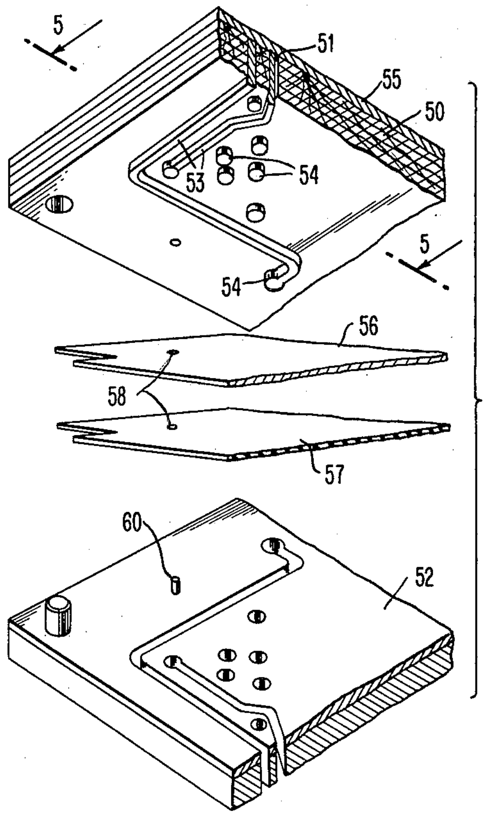
FIG. 4 is a composite view of a punch and die according to the invention.

The layers of the circuit board are prepared by transferring the pretinned copper into the plastic layer. This is done by a well known form of steel rule punch and die similar to that disclosed in the Patent 163,674 to K. McKenzie. The conductors and lands of the circuit are transferred to a block 50 (FIG. 4) of plywood or hardwood such as rock maple or the like. The lines are then cut out by a band or jig saw to form kerfs or slots 51. Prior to cutting these kerfs a metal plate 52 preferably of steel is temporarily attached to the block 50. The plate 52 will be used as a die plate and the kerfs 51 will be cut in both the block and plate. Holes for the punches that will punch out lands are drilled at the same time. The kerfs and holes are formed slightly narrower than the thickness of the strip steel 52 and steel rod 54 that is to be used to form the steel rule punch. The steel strip or rule and rod is preferably electric furnace alloy steel selected for hardness and impact strength. It is the usual practice to use strip of about 0.05 inch thickness and the portion to be cut out is usually outlined by the steel strip.

In the practice of the present invention the strip used is much heavier since it is desired not only to cut the copper but also transfer or inlay it. Therefore only one strip or rod is used, its thickness being that of the conductors and lands in the circuit. After the kerfs and holes have been formed this plate 52 is replaced by a backing plate 55. The steel rule or strip 53 is now formed to fit the kerfs 51. It is then hardened and inserted in the block 50 together with the short pieces of rod 54. They are then ground flat and used to shear the edges of the kerfs and holes in the steel die plate 52 that was removed from the plywood block.

All of the copper sheet or foil 56 (FIG. 4) is pretinned and the plastic sheet 57 is uncured and therefore relatively soft. Both may be provided with a locating hole 58 adapted to engage a pin 60. When the punch and die are closed under pressure the steel rules and rod ends will cut the copper foil which then becomes a punch to cut through the plastic. The locating pin 60 also acts as a stop limiting the travel of the punch so that the copper will be transferred into the plastic but not through it. Five punches and dies will be required for the circuit boards disclosed. It is obvious however, that many more than two circuits may be assembled in a laminated circuit board.

After the layers are formed they are stacked using the locating holes 58 and placed in a heated press where the temperature and pressure are regulated to plasticize the plastic and melt the tinning between circuits thus interconnecting them.

Figure 6:
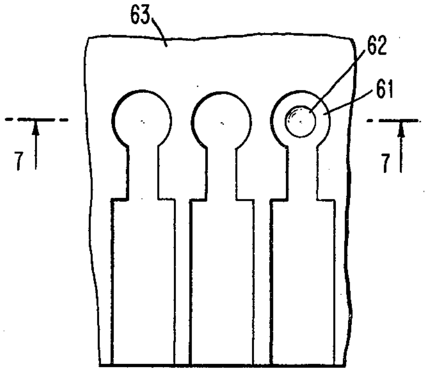
FIG. 6 is a fragmentary view of FIG. 2 showing a modification of the invention.
Figure 5:
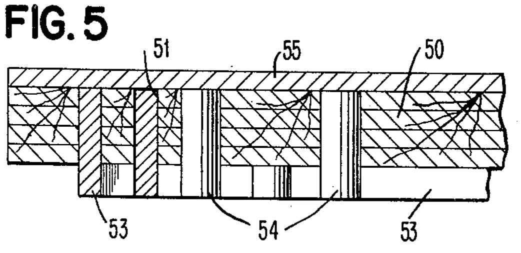
FIG. 5 is a cross section taken along line 5—5 of FIG. 4.
Figure 7:
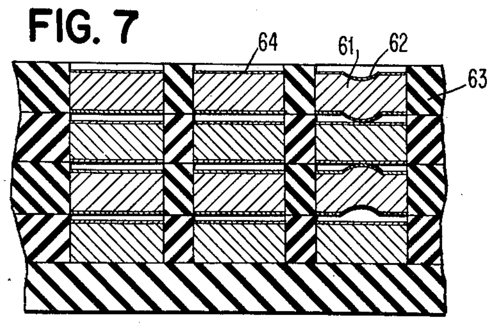
FIG. 7 is a cross section taken along line 7—7 of FIG. 6.

A modified form of land 61 is shown in FIGS. 6 and 7. Each land is dimpled at 62 to insure complete contact between layers. The other lands 6 are undimpled. In FIG. 7 the plastic sheets 63 are uncured and the tinning 64 can be seen on the lands.

Figure 8:
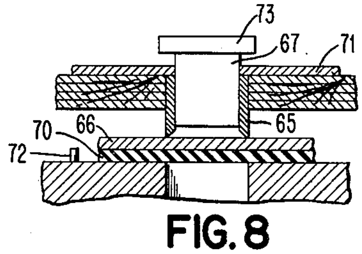
FIG. 8 is a cross section through a modified form of punch.

In FIG. 8 is shown a modified form of steel rule die for forming large lands such as commutator segments and the like that would be exposed in one of the outside layers of the circuit board. In this instance the provision of a steel rule of the thickness necessary to punch out a segment would be impractical. It is proposed therefore that the usual form of sharpened steel strips 65 normally used in steel rule dies be used to outline-cut the copper 66 and a plunger or kick out 67 of metal is provided. This being of approximately the same shape as that enclosed by the steel strips will force the copper cutout into the plastic sheet 70 and punch out the plastic. In operation the plate 71 backing the steel strip punch will be forced down until it reaches a limit stop 72. The plate 73 will then be depressed carrying the kick out 67 and the copper cutout into the plastic sheet.

This process is very economical as the steel rule dies can be made for about one third the cost of regular dies and the circuit layers are formed by a one shot operation; i.e., the transferring of the circuit cutout from the copper sheet into the plastic. Also, once the layers are stacked the encapsulating and soldering of the different connections are made at one time. Thus, once the die is made there are only three operations necessary for completing a circuit card: (1) transferring the conductors of the circuit into the uncured plastic sheet by punching, (2) assembling the separate layers, and (3) plasticizing and soldering by heat and pressure.

In the claims and specification it is to be understood that the term inlay as used for the conductive material is to mean a complete substitution of copper for the chad or chip punched from the plastic sheet.

While the invention has been particularly shown and described with references to preferred embodiments thereof, it will be understood by those skilled in the art that various changes in form and details may be made therein without departing from the spirit and scope of the invention.

What is claimed is:

1. A method of forming an encapsulated multi-layer circuit card, comprising the steps of assembling a sheet of metallic conductive material over a first layer of uncured plastic, stamping out of said sheet with a steel rule punch at least one length of conductive path with enlarged lands, said stamping removing the underlying length of plastic and substituting the corresponding conductive path in said first layer simultaneously, assembling on one or both sides of said first layer other layers of uncured plastic at least one of which has inserted therein additional conductive lands, positioning said additional lands in alignment with the lands in said first layer, and curing said layers of plastic by applying heat and pressure to encapsulate said conductive path and lands leaving said additional lands exposed in an exterior surface of said circuit card.

2. A method of forming an encapsulated multi-layer circuit card, comprising the steps of assembling a pretinned metallic conductor over a first layer of uncured plastic, stamping out of said conductor with a steel rule punch at least one length of conductive path with enlarged lands, said stamping removing the underlying length of plastic and substituting the corresponding conductive path in said first layer simultaneously, assembling on one or both sides of said first layer other layers of uncured plastic at least one of which has inserted therein additional pretinned conductive lands, positioning said additional lands in alignment with the lands in said first layer, and curing said layers of plastic by applying heat and pressure to encapsulate said conductive path and lands leaving said additional lands exposed in an exterior surface of said circuit card, said heat causing the tinning to flow to interconnect said lands.

3. A method of forming an encapsulated multi-layer circuit card, comprising steps of assembling a pretinned conductive foil over a first layer of uncured plastic; stamping out of said foil with a steel rule punch at least one length of conductive path with enlarged lands, said stamping removing the underlying length of plastic and substituting the corresponding conductive path in said first layer simultaneously, assembling on one or both sides of said first layer other layers of uncured plastic at least one of which has inserted therein additional pretinned conductive lands, positioning said additional lands in axial alignment with the lands in said first layer, curing said layers of plastic by applying heat and pressure to encapsulate said conductive path and lands leaving said additional lands exposed in an exterior surface of said circuit cards, said heat causing the tinning to flow to interconnect said lands and forming aligned holes in said plastic and land areas to permit the assembly of electrical components on said circuit board.

4. A method of forming an encapsulated multi-layer circuit card, comprising the steps of assembling a pretinned sheet of conductive material over a first layer of uncured thermo setting plastic, stamping out of said copper with a steel rule punch at least one length of conductive path with enlarged lands, said stamping removing the underlying length of plastic and substituting the corresponding conductive path of conductive material in said first layer simultaneously, assembling on one or both sides of said first layer other layers of uncured plastic at least one of which has inserted therein additional pretinned conductive lands, positioning said additional lands in alignment with the lands in said first layer, and curing said layers of plastic by applying heat and pressure to encapsulate said conductive path and lands, said heat causing the tinning to flow and thereby interconnect said lands.

(References on following page)

References Cited in the file of this patent

UNITED STATES PATENTS

| | | |
|---|---|---|
| 2,066,511 | Arlt | Jan. 5, 1937 |
| 2,244,009 | Heinsch et al. | June 3, 1941 |
| 2,502,291 | Taylor | Mar. 28, 1950 |
| 2,753,619 | Franklin | July 10, 1956 |
| 2,864,156 | Cardy | Dec. 16, 1958 |
| 2,876,393 | Tally et al. | Mar. 3, 1959 |
| 2,889,532 | Slack | June 2, 1959 |
| 2,912,747 | Oshry et al. | Nov. 17, 1959 |
| 2,961,746 | Lyman | Nov. 29, 1960 |

FOREIGN PATENTS

| | | |
|---|---|---|
| 695,126 | Great Britain | Aug. 5, 1953 |